United States Patent [19]

Kikuchi et al.

[11] 4,070,443

[45] Jan. 24, 1978

[54] PROCESS FOR REMOVING SULFATE IONS FROM EXTRACTED PHOSPHORIC ACID WITH A BARIUM COMPOUND

[75] Inventors: Mitsuo Kikuchi; Yoichi Hiraga, both of Shin-nanyo, Japan

[73] Assignee: Toyo Soda Manufacturing Co., Ltd., Japan

[21] Appl. No.: 698,710

[22] Filed: June 22, 1976

[30] Foreign Application Priority Data

Feb. 13, 1976 Japan .................................. 51-13941
Feb. 13, 1976 Japan .................................. 51-13944
Feb. 13, 1976 Japan .................................. 51-13945

[51] Int. Cl.$^2$ ........................................... C01B 25/16
[52] U.S. Cl. ............................. 423/321 R; 210/38 R; 423/321 S
[58] Field of Search ................ 423/321 R, 321 S, 335; 210/38 R

[56] References Cited

U.S. PATENT DOCUMENTS

| 1,889,929 | 12/1932 | Moore | 423/321 |
|---|---|---|---|
| 3,186,793 | 6/1965 | Gillis | 423/321 |
| 3,366,448 | 1/1968 | Martin et al. | 423/321 |

FOREIGN PATENT DOCUMENTS

| 45-21173 | 9/1968 | Japan | 423/321 |
|---|---|---|---|
| 1,103,224 | 2/1968 | United Kingdom | 423/321 |

OTHER PUBLICATIONS

Baker Chem. Catalog, – No. 620 – 1961 – p. 167.

*Primary Examiner*—Edward J. Meros
*Assistant Examiner*—Eugene T. Wheelock
*Attorney, Agent, or Firm*—Oblon, Fisher, Spivak, McClelland & Maier

[57] ABSTRACT

A process for removing sulfate ions from extracted phosphoric acid which is substantially free of metallic ion impurities and which has been prepared by extracting wet process phosphoric acid with an organic solvent which comprises:

a. adjusting the extracted phosphoric acid concentration to a concentration greater than 70%;

b. adding an amount of a barium compound which is less than the stoichiometric equivalent amount of barium relative to the amount of dissolved sulfate ion to form barium sulfate crystals; and c. separating said barium sulfate from the resulting slurry at a temperature less than 80° C and recovering purified, extracted phosphoric acid;

wherein the amount of barium compound added is such that said purified extracted phosphoric acid contains at least 5 ppm of sulfate ions.

13 Claims, No Drawings

PROCESS FOR REMOVING SULFATE IONS FROM EXTRACTED PHOSPHORIC ACID WITH A BARIUM COMPOUND

BACKGROUND OF THE INVENTION

1. Field of the Invention

The present invention relates to a process for preparing pure phosphoric acid by removing sulfate ions from phosphoric acid prepared by the wet process.

2. Description of the Prior Art

It is known that wet process phosphoric acid which is produced by sulfuric acid decomposition of phosphate rock can be extracted by an organic solvent which dissolves the phosphoric acid and has a low solubility in water. Such solvents include various alcohols, ketones, ethers, phosphoric acid esters, amines and the like. Subsequently, phosphoric acid is extracted by water from the extracted solution of phosphoric acid (hereinafter referred to as the "extraction method"). The purified phosphoric acid prepared by further purifying a crude phosphoric acid from the wet process (including one which has been pretreated) by the extraction method (including one which has been subsequently concentrated) is referred to as an "extracted phosphoric acid".

The phosphoric acid produced by the wet process contains various metal ion impurities derived from phosphate rock and sulfate ions derived from sulfuric acid. In the extraction method, the metal ion impurities can be effectively removed. However, sulfate ions are not satisfactorily removed and a large amount of them still remain in the extracted phosphoric acid. Unfortunately, the phosphoric acid used in industrial products, medicines and foods must be pure phosphoric acid having substantially no sulfate ions. For example, a content of less than 30 wt ppm as $SO_4$ is the Japanese Industrial Standard. In order to sufficiently decrease the concentration of sulfate ions so that the phosphoric acid can be used for industrial purposes, it is necessary to remove sulfate ions either from the wet process phosphoric acid and/or the extracted phosphoric acid. It is known to remove sulfate ions as calcium sulfate from the wet process phosphoric acid by adding a calcium compound such as phosphate rock, calcium hydroxide or calcium carbonate. But calcium sulfate has a relatively high solubility. Accordingly, although a large excess of calcium compound is used, sulfate ions remain in a concentration in the range of 1000 – 2000 wt ppm as $SO_4$. It is difficult to further lower the concentration of sulfate ions. Even when the desulfated wet process phosphoric acid is further purified by extraction, a sulfate ion concentration typically of at least 500 wt ppm as $SO_4$ remains in the extracted phosphoric acid.

It is also known to remove sulfate ions as barium sulfate to a lower concentration by using a barium compound. However, it is not preferred to use such a method in a wet process phosphoric acid because of the following reasons.

a. The sulfate ion content is higher than that of the extracted phosphoric acid whereby consumption of the expensive barium compound is high.

b. Hydrofluorosilicic acid is also present whereby the barium compound is consumed for the formation of crystals of barium fluorosilicate.

c. The contents of both sulfate ions and hydrofluorosilicic acid varies in dependence upon fluctuations in the composition of the phosphate rock. Moreover, control of operating conditions is critical whereby the phosphoric acid may be contaminated by barium ions because of an excess addition of the barium compound.

d. Hydrofluoric acid is also present. Therefore, it is difficult to appropriately select a material for use in the filter required for separating barium sulfate. It is difficult to use stainless steel.

e. The crystals of barium sulfate which are obtained are very fine and smaller than those obtained from extracted phosphoric acid. It is theorized that this may be caused by the presence of organic material and metallic impurities. Moreover, the viscosity of the slurry is high even when the concentration of phosphoric acid is low. Accordingly, the separation of barium sulfate is difficult.

SUMMARY OF THE INVENTION

Accordingly, it is an object of the present invention to provide a process for substantially removing sulfate ions from extracted phosphoric acid to the degree required for the phosphoric acid to be useful for industrial products, medicines and foods, such that in the acid, super-fine crystals are not formed and also turbidity is not caused upon storage or during use of the acid; and moreover, such that the acid requires a shorter aging time for prevention of turbidity after the filtering operation.

This and other objects of this invention as will hereinafter become clear have been attained by providing a process for preparing a pure phosphoric acid which comprises adding a barium compound to a phosphoric acid having a concentration higher than 70 wt% as $H_3PO_4$ which is prepared by purifying a crude wet process phosphoric acid with an organic solvent, the amount of the barium compound being less than a stoichiometric equivalent so that at least 5 wt ppm of the dissolved sulfate as $SO_4$ remains and separating the resultant barium sulfate from the slurry at a temperature lower than 80° C.

Other embodiments include repetition of the addition of the barium compound followed by measurement of the remaining dissolved sulfate in the slurry of the process and also the contacting of hydrogen sulfide with the slurry prepared by the barium compound addition.

DETAILED DESCRIPTION OF THE PREFERRED EMBODIMENTS

The present inventors have investigated various processes for substantially removing sulfate ions as barium sulfate from extracted phosphoric acid. As a result, it has been found that super-fine crystals of barium sulfate, which are significantly smaller than the size of fine crystals, are formed by the reaction of sulfate ions with the barium ions. Moreover, turbidity is caused by long storage after the separation of barium sulfate or upon the preparation of condensed phosphoric acids. It has also been observed that these phenomena do not occur if no barium compound treatment is used. Furthermore, it has been determined that the phenomena are caused by the dissolution of barium ions in the phosphoric acid.

It has long been known that barium sulfate is an insoluble salt. Its solubility product in water is in the range of from $8.7 \times 10^{-11}$ to $2.8 \times 10^{-10}$. However, according to a measurement of the solubility product of barium sulfate in pure phosphoric acid, this value is in the range of from $1 \times 10^{-6}$ to $2 \times 10^{-9}$ depending upon the concentration of the phosphoric acid and the temperature. Thus, it is clear that barium sulfate is sparingly soluble but is relatively quite soluble in phosphoric acid as compared to its solubility in water. The present invention has been attained by work growing out of the above-mentioned findings and considerations of the technical problems involved.

1. Amount of the Barium Compound to be Used

The amount of the barium compound added should be less than the stoichiometric equivalent of the $SO_4$-content. At least 5 wt ppm of the dissolved sulfate as $SO_4$ should remain in the extracted phosphoric acid. When the amount is outside of this range, super-fine crystals are formed or the resulting phosphoric acid develops turbidity during storage or use of the phosphoric acid.

2. Number of Barium Compound Additions

In the process of this invention, it is necessary to leave at least 5 wt ppm of the dissolved sulfate as $SO_4$ in the extracted phosphoric acid. On the other hand, the industrial phosphoric acid should contain substantially no sulfate (less than 30 wt ppm of $SO_4$ is the Japanese Industrial Standard). Accordingly, the amount of the barium compound used should be chosen to leave 5-30 wt ppm of the dissolved sulfate as $SO_4$ in the phosphoric acid. But when the extracted phosphoric acid is concentrated to a value higher than 70% as $H_3PO_4$, 500-10,000 wt ppm of $SO_4$ will be present. It is difficult to decrease the $SO_4$ content from 500 to 10,000 wt ppm to 5-30 wt ppm by a one-step addition of the barium compound from the viewpoints of the accuracy of the analysis of $SO_4$, the purity of the barium compound, the accuracy of weighing, etc. Consequently, it is preferred to add a large portion of the barium compound, measure the remaining dissolved sulfate and then to repeat the addition of the barium compound and the measurement of the dissolved sulfate several times. For example, sufficient barium compound can be added to react 80-95% of the dissolved sulfate in the phosphoric acid at first. Then, the barium compound can be further added to leave only 5-30 wt ppm of the dissolved sulfate after the second addition. In this manner, it is easy to prevent the difficulties caused by excess addition of the barium compound and, overall, the number of additions required for a satisfactory product can be lessened.

3. Types of Barium Compounds

Suitable barium compounds for use in the process of this invention include barium hydroxide, barium carbonate, barium phosphate, barium sulfide, barium nitrate, barium chloride and the like. When contamination by the anion must be prevented, it is preferred to use barium hydroxide, barium carbonate or barium phosphate. The barium compound can be added in the form of a solid, an aqueous solution or a phosphoric acid solution. When a phosphoric acid solution of the barium compound having a concentration of less than 10 wt% as Ba is used, crystals of barium sulfate having excellent filterability can be formed. When a phosphoric acid solution of the barium compound having a $H_3PO_4$ concentration of from 10 to 65 wt% which is produced by dissolving barium hydroxide and/or barium carbonate in phosphoric acid is used, phosphoric acid produced after removing the sulfate is not contaminated by anion impurities and the selection of material for use in apparatus employed after the separation of the sulfate is not critical. In addition to these desirable effects, when a phosphoric acid solution of the barium compound, produced by dissolving barium hydroxide or carbonate or another barium compound in a pure phosphoric acid produced by removal of its sulfate is used, the concentration of the phosphoric acid from which sulfate is to be removed is not diluted. Accordingly, it is unnecessary to concentrate the extracted phosphoric acid to a value higher than the desired concentration.

4. Concentration of Phosphoric Acid for the $SO_4$ Removal Treatment

It is necessary to add the barium compound while maintaining the concentration of the phosphoric acid solution to a value higher than 70 wt% as $H_3PO_4$. According to observations, the solubility of barium sulfate in the phosphoric acid solution is a maximum at a concentration of 35 wt% of $H_3PO_4$, is remarkably decreased in the range of 35-70 wt% of $H_3PO_4$ and is further gradually decreased at values higher than 70 wt% of $H_3PO_4$. Accordingly, in order to effectively decrease the amount of dissolved sulfate, it is necessary to add the barium compound at a concentration higher than 70 wt% of $H_3PO_4$. In order to prepare phosphoric acid having suitable concentrations for use in commercial products, it is preferred to add the barium compound at a concentration of 85-95 wt% of $H_3PO_4$. The extracted phosphoric acid solutions usually have a concentration of 20-40 wt% of $H_3PO_4$. When the barium compound is added to such a dilute phosphoric acid solution, the filtering operation for separating the resultant barium sulfate is easy because of the low viscosity of the mixture. However, when the filtered phosphoric acid solution is concentrated to a value suitable for industrial grade phosphoric acid having a concentration of 75 wt% of $H_3PO_4$, a turbidity which is difficult to remove by filtration, is caused during further concentration or storage.

5. Reaction of the Barium Compound with Sulfate

It is possible to use either a batch system or a continuous system for the reaction under the above-mentioned conditions. An object of this invention is to provide a process for easily separating and removing the resultant crystals of barium sulfate formed in the separation of sulfate ions from extracted phosphoric acid. In order to attain this object of the invention, it is preferred to continuously add the extracted phosphoric acid and the barium compound to phosphoric acid having from 300 to 50 wt ppm of dissolved sulfate as $SO_4$ (first step). When barium compound is then added to this slurry produced by the first step (second step), the dissolved sulfate can be further removed to lower the concentration without decreasing the filterability of the crystals. When the crystals produced in the second step are recycled to the first step, the filterability of the crystals can be further improved. For such a continuous process, the reaction operation is easy, the series of steps can be continuously conducted and the reactor and filtering apparatus can be simplified and miniaturized.

As is well-known, crystal growth of barium sulfate is quite slow because of the low degree of supersaturation of barium sulfate. The crystals of barium sulfate crystallized in a phosphoric acid having from 300 to 50 wt ppm of dissolved sulfate as $SO_4$ have a remarkably high filterability as compared with those of crystals crystallized under other conditions. They can be easily filtered by conventional fibers. It is theorized that when the concentration of dissolved sulfate is more than 300 wt ppm, there is significant formation of nuclei because of the high reaction velocity of the dissolved sulfate with the barium compound. On the other hand, when the concentration is less than 50 wt ppm, the degree of supersaturation of the barium sulfate is very low and is unstable whereby fine crystals are easily formed.

One of the embodiments of the first step is to convert the dissolved sulfate to a barium sulfate which can be easily filtered. The first step is necessarily conducted by a continuous process. Extracted phosphoric acid usually contains dissolved sulfate in a concentration of about 500 to 10,000 wt ppm as $SO_4$, even if it is produced by treating a crude phosphoric acid with a calcium compound and extracting. Consequently, in a batch system, that is, simple addition of the barium compound to the extracted phosphoric acid, the reaction is conducted in a concentration of dissolved sulfate of more than 300 ppm, whereby the amount of crystals having inferior filterability is increased. Moreover, in a batch system, when the barium compound is added only once in the operation, crystals having inferior filterability are formed and a long aging time is required. On the other hand, if the barium compound is gradually added, a long period of time is required for the complete addition. The aging time can be shortened but the overall procedure still takes a relatively long time. To the contrary, the residence time in the first step of the continuous process can be quite short. It can be shortened to at least one sixth of the time required in the batch system. The desirable residence time can be selected by choosing the speed of addition of the extracted phosphoric acid and the barium compound.

The temperature in the first step should be in the range of from room temperature to 100° C, preferably 50° to 80° C.

It has further been found that when more barium compound is added to a slurry of phosphoric acid having 300 to 50 wt ppm of the dissolved sulfate as $SO_4$, which is produced in the first step, the filterability of the slurry is substantially the same as that of the first step. Generally, the slurry produced in the first step contains 300 to 50 wt ppm of the dissolved sulfate as $SO_4$. Thus, in the second step, when the barium compound is added and its presence maintained for aging, the concentration of dissolved sulfate can be decreased to less than 30 wt ppm without decreasing filterability. The reason why the filterability of the crystals is not decreased in the second step is not clear. However, it is theorized that it occurs because of a synergistic effect between the crystals formed in the first step and the crystals formed in the second step.

It has been found that when the barium compound is added to produce a concentration of less than 5 wt ppm of the dissolved sulfate as $SO_4$, filtration becomes difficult even after aging, super-fine crystals are formed and turbidity occurs during storage or during the preparation of condensed phosphoric acid after filtration. Accordingly, it is necessary to maintain at least 5 wt ppm of the dissolved sulfate as $SO_4$ in the second step. The second step can be either a continuous process or a batch process. The aging time (residence time in a continuous process) can be quite short, e.g., from 1 to 6 hours. In this embodiment, the total of the residence time in the first step and the aging time (residence time) in the second step can also be quite short, e.g., shorter than 10 hours.

As stated above, it is necessary to adjust the concentration of sulfate as $SO_4$ to from 30 to 50 wt ppm in the preparation of phosphoric acid used in industry. It is not easy to adjust the concentration of sulfate in phosphoric acid to this narrow range by simply adding a barium compound to it, e.g., because of errors of measurement. However, in the above embodiment, the concentration of the dissolved sulfate is decreased to from 300 to 50 wt ppm in the first step. Accordingly, it is easy to further decrease it to 30 to 5 wt ppm in a second step. When the crystals of the second step are produced after aging and are recycled to the first step, they act as seed crystals, resulting in the formation of crystals having higher filterability in the first step and also in the second step. The recycled crystals preferably are a part of the slurry in the second step. This is advantageous from the viewpoint of transportation. It is also possible to recycle a portion of the crystals obtained by filtering the slurry. The amount of the crystals recycled should be in the range of from 2 to 20%, preferably 5 to 10%, of the total crystals present in the second step.

6. Treatment with Hydrogen Sulfide

Even when a clear phosphoric acid is obtained after filtration of barium sulfate, turbidity is caused upon storage for a long period of time. In order to prevent this difficulty, it is necessary to age the slurry for a long period, e.g., from one to several days. In an attempt to shorten the aging time, it has been found that the aging time can be remarkably reduced by contacting hydrogen sulfide with the slurry prepared by adding the barium compound to the phosphoric acid. Long aging times may be required, for example, because a supersaturation condition may be remarkably stable. However, when hydrogen sulfide contact is used, supersaturation is easily prevented by the dissolution of hydrogen sulfide in the phosphoric acid and the aging time required for crystal formation can be substantially shortened. The required aging time for the slurry after contacting hydrogen sulfide can be as short as only 0.5 to 6 hours. The ratio of hydrogen sulfide to the phosphoric acid is usually higher than 0.05 kg of $H_2S$, preferably higher than 0.1 kg of $H_2S$ per one ton of $P_2O_5$.

7. Temperature of the Slurry for Separation of Barium Sulfate

It is necessary to separate barium sulfate from the slurry at a temperature lower than 80° C. When the temperature is higher than 80° C, the solubility of barium sulfate in the phosphoric acid greatly increases. Thus, it is impossible to decrease the $SO_4$ content to the above-mentioned industrial range by adding a barium compound in an amount less than the stoichiometric equivalent to $SO_4$. The reaction of the barium compound with $SO_4$ can be conducted at a temperature higher than 80° C. However, in this case, barium sulfate should be separated after cooling the resulting slurry to lower than 80° C. In order to form barium sulfate crystals having high filterability, it is preferred to form them at about an 80° C reaction temperature, to cool the slurry to 20°-60° C during aging and to separate the crystals at a similar temperature. When a hydrogen sulfide treatment is used, it is possible to contact the hydrogen sulfide with the slurry at a relatively low temperature so as to increase the solubility of hydrogen sulfide in the phosphoric acid. The treated slurry is then aged.

As can be clearly understood from above, in accordance with the process of this invention, fine crystals are not formed in a process for removing sulfate from phosphoric acid, turbidity in the phosphoric acid does not occur during storage and a phosphoric acid which contains $SO_4$ in a concentration lower than that required for industrial, medical and food uses, can be obtained. Moreover, when a hydrogen sulfide treatment is used, any arsenic component impurities can also be effectively removed, regardless of the concomitant content of organic material. When both dissolved sulfate and arsenic compounds are removed by the process of this invention, the filtering characteristics of the solid materials produced are superior to those produced either from the treatment of a dissolved sulfate with the barium compound or of a dissolved arsenic compound with hydrogen sulfide. Filtering operation difficulties caused by fine precipitates of sulfide and sulfur formed by oxidation of hydrogen sulfide have been serious in conventional processes. However, in accordance with the process of this invention, the filtering operation is easy and a clear phosphoric acid can be obtained.

Having generally described the invention, a more complete understanding can be obtained by reference to certain specific examples, which are included for purposes of illustration only and are not intended to be limiting unless otherwise specified.

The terms "%" and "ppm" are respectively, "% by weight" and "ppm by weight", R represents metal elements and the transmittance is measured by using water as a blank.

EXAMPLE 1

Crude wet process phosphoric acid prepared by treating phosphate rock (Morocco) with sulfuric acid ($H_3PO_4$ - 47.6%; $SO_4$ - 0.92%) was contacted with n-butanol in a multi-stage counter-current extraction. The extracted solution of phosphoric acid was back-extracted with water to obtain the following extracted phosphoric acid solution.

| | |
|---|---|
| $H_3PO_4$ | 33.0% |
| $SO_4$ | 0.320% |
| $R_2O_3$ | 0.0005% |

The extracted phosphoric acid solution was condensed under a reduced pressure of −650 mmHg (gauge) to obtain the following $SO_4$-containing phosphoric acid.

| | |
|---|---|
| $H_3PO_4$ | 75.4% |
| $SO_4$ | 0.732% |
| $R_2O_3$ | 0.001% |

A 28.0 g sample of powdered barium carbonate was slowly added to 2000 g of the $SO_4$-containing phosphoric acid at 80° C with stirring during 1 hour. After the addition, the mixture was gradually cooled and was aged at room temperature for 40 hours to obtain the following slurry.

| | |
|---|---|
| $H_3PO_4$ | 75.2% |
| Dissolved $SO_4$ | 508 ppm |
| $R_2O_3$ | 10 ppm |
| $BaSO_4$ crystals | 1.65% |

A 300 g sample of the resulting slurry was heated to 80° C and 300 mg of powdered barium carbonate was added for reaction. The mixture was gradually cooled to room temperature and was maintained at room temperature for 40 hours. It was then filtered at room temperature through a G-5 glass filter, to obtain a pure phosphoric acid having the following composition a transmittance.

| | |
|---|---|
| $H_3PO_4$ | 75.5% |
| $SO_4$ | 21.0 ppm |
| $R_2O_3$ | 10 ppm |
| Transmittance | 101% |

When the pure phosphoric acid was stored for 1 month at room temperature, no change was found.

REFERENCE EXAMPLE 1

300 mg of powdered barium compound was added to 300 g of the slurry of Example 1 at 100° C. The mixture was kept at 100° C for 40 hours and was filtered at about 95° C (through a G-5 glass filter) to obtain a clear phosphoric acid. However, when the phosphoric acid was stored at room temperature for a month, the transmittance of the phosphoric acid decreased to 89% and turbidity was observed.

REFERENCE EXAMPLE 2

A 300 g sample of the slurry of Example 1 was diluted with water to 60% $H_3PO_4$ and 300 mg of powdered barium carbonate was added to the diluted solution at 80° C. The mixture was gradually cooled to room temperature and was kept at room temperature for 40 hours. It was then filtered through a G-5 glass filter to obtain a clear phosphoric acid solution. The solution was concentrated to obtain a phosphoric acid having the following composition and transmittance.

| | |
|---|---|
| $H_3PO_4$ | 75.8% |
| $SO_4$ | 30.3 ppm |
| $R_2O_3$ | 10 ppm |
| Transmittance | 96% |

When the phosphoric acid was stored at room temperature for 1 month, turbidity was found and the transmittance decreased to 77%.

REFERENCE EXAMPLE 3

In accordance with the process of Example 1, except for adding 320 mg of powdered barium carbonate to 300 g of the slurry, a phosphoric acid having the following composition and transmittance was obtained.

| | |
|---|---|
| $H_3PO_4$ | 75.4% |
| $SO_4$ | 2.7 ppm |
| $R_2O_3$ | 10 ppm |
| Transmittance | 89% |

When the phosphoric acid was stored at room temperature for 1 month, the transmittance decreased to 76%.

EXAMPLE 2

Crude wet process phosphoric acid prepared by treating phosphate rock (Florida) with sulfuric acid ($H_3PO_4$ - 48.9%; $SO_4$ - 5.1%) was mixed with calcium hydroxide in an amount of 1.2 times the equivalent amount. The resulting calcium sulfate was separated to obtain the following wet process phosphoric acid solution.

| | |
|---|---|
| $H_3PO_4$ | 46.1% |
| $SO_4$ | 0.26% |

-continued

| | |
|---|---|
| $R_2O_3$ | 2.0% |

The phosphoric acid solution was contacted with tributyl phosphate in a multi-stage counter-current extraction and the extraction solution of phosphoric acid was back-extracted with water to obtain an extracted phosphoric acid solution. (A part of this is used in Reference Example 4.) The extracted phosphoric acid solution was condensed to obtain the following phosphoric acid.

| | |
|---|---|
| $H_3PO_4$ | 91.6% |
| $SO_4$ | 643 ppm |
| $R_2O_3$ | 14 ppm |

A 4.53 g sample of barium salt-phosphoric acid mixture ($H_3PO_4$ - 50%; Ba - 6.0%) prepared by dissolving barium carbonate in phosphoric acid, was added to 300 g of the phosphoric acid for reaction. The mixture was aged for 40 hours and was filtered through a G-5 glass filter to obtain a clear phosphoric acid having the following composition and transmittance. The reaction, the aging and the filtration were conducted at 30° C.

| | |
|---|---|
| $H_3PO_4$ | 90.6% |
| $SO_4$ | 7.9 ppm |
| $R_2O_3$ | 13 ppm |
| Transmittance | 103% |

When the phosphoric acid was stored at room temmperature for 1 month, the transmittance was not changed.

REFERENCE EXAMPLE 4

The extracted phosphoric acid solution of Example 2 was condensed to obtain a phosphoric acid solution having the following composition and transmittance.

| | |
|---|---|
| $H_3PO_4$ | 46.3% |
| $SO_4$ | 325 ppm |
| $R_2O_3$ | 7 ppm |
| Transmittance | 101% |

A 2.2 g sample of the barium salt-phosphoric acid solution of Example 2 was added to 300 g of the phosphoric acid solution. The mixture was aged for 40 hours and was filtered through a G-5 glass filter to obtain a phosphoric acid solution having the following composition and transmittance. The reaction, the aging and the filtration were conducted at 30° C.

| | |
|---|---|
| $H_3PO_4$ | 47.0% |
| $SO_4$ | 34.1 ppm |
| $R_2O_3$ | 7 ppm |
| Transmittance | 102% |

When a part of the phosphoric acid solution was concentrated, turbidity was found at a concentration of 70% of $H_3PO_4$. When the remainder was stored at room temperature for 1 month, the turbidity decreased to 92%.

EXAMPLE 3

Crude wet process phosphoric acid prepared by treating phosphate rock (Morocco) with sulfuric acid ($H_3PO_4$ - 47.6%; $SO_4$ - 0.92%) was contacted with n-butanol in a multi-stage counter-current extraction and the extracted solution of phosphoric acid was back-extracted with water to obtain the following extracted phosphoric acid solution.

| | |
|---|---|
| $H_3PO_4$ | 33.0% |
| $SO_4$ | 0.320% |

The extracted phosphoric acid solution was condensed under a reduced pressure to obtain the followng $SO_4$-containing phosphoric acid.

| | |
|---|---|
| $H_3PO_4$ | 75.4% |
| $SO_4$ | 0.732% |

A 42.0 g sample of powdered barium carbonate was added to 3000 g of the phosphoric acid with stirring at 80° C during about 1 hour. The mixture was gradually cooled and was kept at room temperature for 40 hours to obtain the following slurry.

| | |
|---|---|
| $H_3PO_4$ | 75.2% |
| Dissolved $SO_4$ | 508 ppm |
| Solid component | 1.65% |

A 300 mg sample of powdered barium carbonate was added to 300 g of the slurry at 80° C and the mixture was gradually cooled to the room temperature. 0.2 g of hydrogen sulfide was injected into the mixture and the mixture was kept for 5 hours and filtered to obtain the following pure phosphoric acid.

| | |
|---|---|
| $H_3PO_4$ | 75.5% |
| $SO_4$ | 21.3 ppm |
| Transmittance | 103% |

When the phosphoric acid was stored for 1 month, no change was found. In the filtering operation of Example 3 and the following cases, a G-2 glass filter precoated with an auxiliary material Fine flow (manufactured by Showa Kagaku Kogyo K.K.) at a thickness of 3 mm was used under a reduced pressure of −0.92 kg/cm² (guage).

REFERENCE EXAMPLE 5

A 300 mg sample of powdered barium carbonate was added to 300 g of the slurry of Example 3 at 100° C. A 0.2 g sample of hydrogen sulfide was injected into the mixture at 100° C and the mixture was kept for about 5 hours. It was filtered at about 95° C to obtain a clear phosphoric acid. When the phosphoric acid was stored for 1 month, turbidity was observed and the transmittance decreased to 89%.

REFERENCE EXAMPLE 6

A 300 g sample of the slurry of Example 3 was diluted with water to 60%, and 300 mg of powdered barium carbonate was added to the diluted solution at 80° C. The mixture was gradually cooled to room temperature, and 0.2 g of hydrogen sulfide was injected into the mixture. The treated mixture was kept for 5 hours and filtered at room temperature to obtain a clear filtrate. The filtrate was condensed under a reduced pressure to obtain the following phosphoric acid.

| | |
|---|---|
| $H_3PO_4$ | 75.7% |

-continued

| | |
|---|---|
| SO$_4$ | 30.1 ppm |
| Transmittance | 96% |

When the phosphoric acid was stored for 1 month, the transmittance decreased by 79%.

EXAMPLE 4

Crude wet process phosphoric acid prepared by treating phosphate rock (Florida) with sulfuric acid (H$_3$PO$_4$ - 48.9%; SO$_4$ - 5.1%) was admixed with calcium hydroxide in an amount of 1.2 times the equivalent amount. The resulting calcium sulfate was separated to obtain the following wet process phosphoric acid solution.

| | |
|---|---|
| H$_3$PO$_4$ | 46.1% |
| SO$_4$ | 0.26% |
| As | 19 ppm |

The phosphoric acid solution was contacted with tributyl phosphate in a multi-stage counter-current extraction and the extracted solution of phosphoric acid was back-extracted with water. The extracted phosphoric acid solution was condensed to obtain the following phosphoric acid.

| | |
|---|---|
| H$_3$PO$_4$ | 91.6% |
| SO$_4$ | 643 ppm |
| As | 35 ppm |

A barium salt-phosphoric acid solution (H$_3$PO$_4$ - 50%; BA - 6.0%) was prepared by dissolving barium carbonate in phosphoric acid. A 4.53 g sample of the barium salt-phosphoric acid solution was added to 300 g of the phosphoric acid and about 0.5 g of hydrogen sulfide was injected into the mixture. The mixture was aged for 2 hours and filtered. The treatments of the barium salt and hydrogen sulfide were conducted at 30° C. The filtering speed in the filtering operation was 0.89 m$^3$/m$^2$.hr and the following phosphoric acid was obtained.

| | |
|---|---|
| H$_3$PO$_4$ | 90.5% |
| SO$_4$ | 8.1 ppm |
| As | 0.01 ppm |
| Transmittance | 103% |

When the phosphoric acid was stored at room temperature for 1 month, the transmittance was not changed.

EXAMPLE 5

A phosphate rock (Morocco) was treated with sulfuric acid to obtain a crude wet process phosphoric acid (H$_3$PO$_4$ - 47.6%; SO$_4$ - 0.92%). The crude wet process phosphoric acid was contacted with n-butanol in a mutli-stage counter-current extraction and the extracted solution of phosphoric acid was back-extracted with water to obtain an extracted phosphoric acid solution (H$_3$PO$_4$ - 33.0%; SO$_4$ - 0.320%). The extracted phosphoric acid solution was concentrated under a reduced pressure to obtain an extracted phosphoric acid (H$_3$PO$_4$ - 82.6%; SO$_4$ - 0.802%) In a 1 liter reactor, the extracted phosphoric acid was fed at a flow rate of 500 g/hr and powdered barium carbonate was also continuously fed at the rates shown in Table I. The reaction was continuously conducted. The residence time in the reactor was 3.3 hours. The operation was conducted for 48 hours to obtain a slurry having the components shown in the table. (A part of this slurry was used in Example 6.) A part of the slurry was filtered and the components of the slurry and the filtering speed were measured. The results are shown in Table I.

TABLE I

| | Example 5 |
|---|---|
| Feed rate of barium carbonate (g/hr) | 8.00 |
| Composition of slurry | |
| H$_3$PO$_4$ (%) | 81.7 |
| Dissolved SO$_4$ (ppm) | 218 |
| BaSO$_4$ crystals (%) | 1.87 |
| Filtering speed (m$^3$/m$^2$. hr) | 0.61 |
| Condition of filtrate | clear |

EXAMPLE 6

A 205 mg sample of powdered barium carbonate was added to 500 g of the slurry of Example 5 at 60° C. The mixture was gradually cooled and was aged at 45° C for 6 hours. The slurry was filtered. The filtrate was clear and the composition and the filtering speed were as follows:

| | |
|---|---|
| H$_3$PO$_4$ | 81.3% |
| SO$_4$ | 17 ppm |
| Filtering speed | 0.62 m$^3$/m$^2$. hr |

The filtrate was stored for 1 month and no turbidity was found.

EXAMPLE 7

Calcium hydroxide was added to a crude wet process phosphoric acid (H$_3$PO$_4$ - 48.9%; SO$_4$ - 5.1%) which was prepared by treating phosphate rock (Florida) with sulfuric acid in an amount 1.2 times the stoichiometric equivalent to SO$_4$. The resulting calcium sulfate was separated to obtain a phosphoric acid solution (H$_3$PO$_4$ - 46.1%; SO$_4$ - 0.26%). The phosphoric acid solution was contacted with tributyl phosphate in a multi-stage counter-current extraction. The extracted solution of phosphoric acid was back-extracted with water and concentrated to obtain an extracted phosphoric acid (H$_3$PO$_4$ - 91.6%; SO$_4$ - 643 ppm). A barium salt phosphoric acid mixture (H$_3$PO$_4$ - 50%; Ba - 6.00%) was prepared by dissolving barium hydroxide in phosphoric acid. Extracted phosphoric acid was fed at 5000 g/hr; the barium salt-phosphoric acid mixture was fed at 60.0 g/hr; and the slurry discharged from the following second reactor was fed at 250 g/hr into a 5 liter first reactor heated to 80° C. The slurry discharged from the first reactor was continuously fed into a 10 liter second reactor heated to 45° C along with the barium salt-phosphoric acid mixture at 15.0 g/hr. The operation was continued for about 72 hours under these conditions. The residence time in the first reactor was about 1.7 hours and that of the second reactor was 3.3 hours. The slurry discharged from the second reactor was filtered. The filtering speed was 3.70 m$^3$/m$^2$.hr and the filtrate was clear and had the following components.

| | |
|---|---|
| H$_3$PO$_4$ | 90.7% |
| SO$_4$ | 12.8 ppm |

The concentration of the dissolved sulfate in the slurry discharged from the first reactor was 138 ppm as SO$_4$.

EXAMPLE 8

Crude wet process phosphoric acid prepared by treating phosphate rock (Morocco) with sulfuric acid ($H_3PO_4$ - 47.6%; $SO_4$ - 0.92%) was contacted with n-butanol in a multi-stage counter-current extraction and the extracted solution of phosphoric acid was back-extracted with water to obtain the following extracted phosphoric acid solution.

| | |
|---|---|
| $H_3PO_4$ | 33.0% |
| $SO_4$ | 0.320% |

The extracted phosphoric acid solution was condensed under a reduced pressure to obtain the following $SO_4$-containing phosphoric acid.

| | |
|---|---|
| $H_3PO_4$ | 92.6% |
| $SO_4$ | 0.888% |

Barium carbonate was dissolved in a pure phosphoric acid to prepare a barium salt-phosphoric acid mixture. ($H_3PO_4$ - 50%; Ba - 6.00%). A 205.0 g of the barium salt-phosphoric acid mixture was gradually added to 1000 g of the phosphoric acid with stirring at 80° C during about 1 hour and the mixture was kept for aging at 80° C for 6 hours to obtain a slurry having a dissolved $SO_4$ of 216 ppm.

A 5.50 g of the barium salt-phosphoric acid solution was added to the slurry to react them at 80° C. The mixture was gradually cooled to keep it for aging at room temperature for 40 hours to obtain the following slurry.

| | |
|---|---|
| $H_3PO_4$ | 85.1% |
| Dissolved $SO_4$ | 24.7 ppm |
| $BaSO_4$ crystals | 1.77% |

A part of the slurry was filtered. The filtering speed in the filtering operation was 0.53 m³/m².hr and the following phosphoric acid was obtained.

| | |
|---|---|
| $H_3PO_4$ | 85.2% |
| $SO_4$ | 24.3 ppm |
| Transmittance | 103% |

When the phosphoric acid was stored at room temperature for 1 month, the transmittance was not changed.

REFERENCE EXAMPLE 7

A part of the extracted phosphoric acid solution of Example 8 was condensed under reduced pressure to obtain the following $SO_4$-containing phosphoric acid.

| | |
|---|---|
| $H_3PO_4$ | 59.8% |
| $SO_4$ | 0.580% |

A 132.0 g of the barium salt-phosphoric acid solution of Example 8 was gradually added to 1000 g of the phosphoric acid with stirring at 80° C during about 1 hour and the mixture was kept for aging at 80° C for 6 hours to obtain a slurry having a dissolved $SO_4$ of 265 ppm. A 6.50 g of the barium salt-phosphoric acid solution was added to the slurry to react them at 80° C. The mixture was gradually cooled to keep it for aging at room temperature for 40 hours to obtain the slurry. The slurry was filtered to obtain a clear filtrate. A part of the filtrate was concentrated in a reduced pressure to obtain the following solution.

| | |
|---|---|
| $H_3PO_4$ | 85.6% |
| $SO_4$ | 27.4 ppm |
| Transmittance | 96% |

When the remaining part of the filtrate ws kept for 1 month, the transmittance decreased to 86%.

EXAMPLE 9

Crude wet process phosphoric acid prepared by treating phosphoric rock (Florida) with sulfuric acid ($H_3PO_4$ - 48.9%; $SO_4$ - 5.1%) was admixed with calcium hydroxide in an amount of 1.2 times the equivalent amount. The resulting calcium sulfate was separated to obtain the following wet process phosphoric acid solution.

| | |
|---|---|
| $H_3PO_4$ | 46.1% |
| $SO_4$ | 0.26% |

The phosphoric acid solution was contacted with tributyl phosphate in a multi-stage counter-current extraction and the extracted solution of phosphoric acid was back-extracted with water. The extracted phosphoric acid solution was condensed to obtain the following phosphoric acid.

| | |
|---|---|
| $H_3PO_4$ | 76.6% |
| $SO_4$ | 550 ppm |

A barium salt-phosphoric acid solution ($H_3PO_4$ - 30%; Ba - 5.0%) was prepared by dissolving barium carbonate in phosphoric acid. The phosphoric acid solution was continuously fed at 1000 g/hr; the barium salt-phosphoric acid mixture was continuously fed at 12.8 g/hr in a 2 liter reactor to react them at 50° C. The operation was continued for about 72 hours to obtain the following slurry.

| | |
|---|---|
| $H_3PO_4$ | 76.2% |
| Dissolved $SO_4$ | 98.6 ppm |
| $BaSO_4$ crystals | 0.11% |

A 2.3 g of the barium salt-phosphoric acid mixture was added dropwise to 1000 g of the slurry at 60° C to react them. The mixture was gradually cooled and was kept for aging at 45° C for 6 hours and was filtered. The filtering speed in the filtering operation was 3.72 m³/m².hr to obtain the following filtrate.

| | |
|---|---|
| $H_3PO_4$ | 75.9% |
| $SO_4$ | 16.9 ppm |
| Transmittance | 105% |

When the phosphoric acid was stored at room temperature for 1 month, the transmittance was not changed.

EXAMPLE 10

Barium carbonate was dissolved in a pure phosphoric acid to prepare a barium salt-phosphoric acid mixture ($H_3PO_4$ - 35%; Ba - 12.0%). In accordance with the process of Example 8 except using each of a half amount of Example 8, the sulfate was removed. As a result, the filtering speed in the filtering operation was 0.21 m³/m².hr (0.53 m³/m².hr in Example 8). Substantially the same results were obtained except the filtering speed.

Having now fully described the invention, it will be apparent to one of ordinary skill in the art that many changes and modifications can be made thereto without departing from the spirit or scope of the invention as set forth herein.

What is claimed as new and intended to be covered by letters patent is:

1. A process for removing sulfate ions from extracted phosphoric acid which is substantially free of metallic ion impurities and which has been prepared by extracting wet process phosphoric acid with an organic solvent which comprises:
   a. adjusting the extracted phosphoric acid concentration to a concentration greater than 70%;
   b. adding to said extracted phosphoric acid a sufficient amount of a barium compound to react with at least 80% of the dissolved sulfate ions and form barium sulfate crystals; and
   c. separating said barium sulfate from the resulting slurry at a temperature less than 80° C and recovering purified, extracted phosphoric acid;
   wherein the amount of barium compound added is such that said purified, extracted phosphoric acid contains at least 5 ppm of sulfate ions.

2. The process of claim 1, wherein the barium compound is added in several increments and after each addition, the amount of the dissolved sulfate remaining in the slurry is measured.

3. The process of claim 2, wherein the amount of the dissolved sulfate remaining in the extracted phosphoric acid is in the range of 5-30 wt ppm after the final addition of the barium compound.

4. The process of claim 1, wherein in addition to said barium compound additive, the phosphoric acid solution is contacted with hydrogen sulfide wherein the separation of the resulting barium sulfate and other solids from the resultant slurry is carried out at a temperature lower than 80° C.

5. The process of claim 4, wherein the barium compound is added in several increments and after said addition, the amount of dissolved sulfate remaining in the slurry is measured, and wherein the slurry is contacted with hydrogen sulfide after the final addition of the barium compound.

6. The process of claim 5, wherein the concentration of the dissolved sulfate remaining in the extracted phosphoric acid is in the range of 5-30 wt ppm after the final addition of the barium compound and the hydrogen sulfide treatment.

7. The process of claim 1, wherein a phosphoric acid solution of the barium compound is added as the source of the barium compound.

8. The process of claim 7, wherein the phosphoric acid solution of the barium compound is produced by dissolving barium hydroxide, barium carbonate or mixtures thereof in phosphoric acid such that the concentration of $H_3PO_4$ is 10 to 65 wt%.

9. The process of claim 7, wherein the phosphoric acid solution of the barium compound contains less than 10 wt% of Ba.

10. The process of claim 7, wherein said purified extracted phosphoric acid is used to dissolve the barium compound.

11. A process for removing sulfate ions from extracted phosphoric acid which is substantially free of metallic ion impurities and which has been prepared by extracting wet process phosphoric acid with an organic solvent which comprises:
    a. adjusting the extracted phosphoric acid concentration to a concentration greater than 70%;
    b. continuously adding said extracted phosphoric acid and a barium compound to be extracted phosphoric acid having a dissolved sulfate ion concentration of from 50 to 300 ppm, wherein the amount of barium compound added is sufficient to reduce the sulfate ion concentration in the added, extracted phosphoric acid to from 50 to 300 ppm wherey barium sulfate crystals are formed;
    c. continuously discharging the resulting slurry;
    d. subsequently adding to said resulting slurry an amount of a barium compound which is less than the stoichiometric equivalent amount of barium relative to the amount of dissolved sulfate ion which remains to form additional barium sulfate crystals, wherein the amount of barium compound added is such that the treated extracted phosphoric acid contains at least 5 ppm of sulfate ions; and
    e. separating said barium sulfate crystals from the resulting slurry at a temperature less than 80° C and recovering purified extracted phosphoric acid.

12. The process of claim 11, wherein at least a portion of the barium sulfate crystals separated from the purified extracted phosphoric acid are recycled to step (b).

13. The process of claim 11 wherein a portion of the slurry prepared in step (d) is recycled to step (b).

* * * * *